United States Patent [19]
Shelton

[11] Patent Number: 5,615,241
[45] Date of Patent: Mar. 25, 1997

[54] PROGRAMMABLE RATE GENERATOR

[75] Inventor: John Shelton, La Selva Beach, Calif.

[73] Assignee: Hewlett-Packard Company, Palo Alto, Calif.

[21] Appl. No.: 269,977

[22] Filed: Jul. 1, 1994

[51] Int. Cl.$^6$ .................. H03K 3/02; G06F 1/08
[52] U.S. Cl. .................. 377/49; 377/51; 395/555
[58] Field of Search .................. 377/52, 51, 39, 377/48, 49; 327/291; 395/550

[56] References Cited

U.S. PATENT DOCUMENTS

| | | | |
|---|---|---|---|
| 3,603,773 | 9/1971 | Carlstein | 235/154 |
| 4,053,879 | 10/1977 | Anderson | 340/351 |
| 5,222,111 | 6/1993 | Muramatsu | 377/49 |

*Primary Examiner*—Thomas M. Heckler
*Assistant Examiner*—Dennis M. Butler
*Attorney, Agent, or Firm*—Jonathan B. Penn

[57] ABSTRACT

A rate generator for use in a video server or other computer system requiring the generation of multiple timing signals from a single fixed frequency clock signal is disclosed. The rate generator stores a count value, a subtrahend value and a preload value for each timing signal that must be generated. The subtrahend value is subtracted from the count value. If this causes an underflow, an underflow signal, which comprises the generated timing signal, is asserted. The preload value is then added to the result of the subtraction, forming the new count value. If an underflow did not result from the subtraction, the result of the subtraction is the new count value. The frequency of the generated timing signal is determined by the ratio of the subtrahend and preload values. This permits the generation of many different timing signals from a single fixed frequency. The architecture required to perform these operations is relatively simple and inexpensive.

7 Claims, 3 Drawing Sheets

PROGRAMMABLE RATE GENERATOR

BACKGROUND OF THE INVENTION

This invention is generally in the field of digital computers. In particular it is in the field of timing circuits for digital computers.

It is frequently necessary in digital computers to generate many timing signals, each having a different frequency, from a single fixed frequency clock signal. These timing signals are used to control various asynchronous tasks and processes within the computer.

A known circuit for generating a timing signal from a fixed frequency clock signal is shown in FIG. 1. A preload value is stored in preload register 125. At the start of operations, the preload value is moved through MUX 123 into decrementing counter 121. With each clock pulse, the value in counter 121 is decremented. If the value in the counter is zero or greater, it is reloaded into the counter through MUX 123 after the decrementing operation. When the value drops below zero, an underflow condition occurs, generating an underflow pulse from counter 121. This pulse also signals MUX 123 to reload the preload value in preload register 125 into counter 121. The generated rate is the number of times per second that the underflow pulse is generated.

For example, if counter 121 is clocked at 100 MHz and the value stored in register 125 is 99, counter 121 underflows at a 1 MHz rate. If the value in register 125 is changed to 19, counter 121 underflows at the rate of 5 MHz.

To generate a different rate, a new preload value must be placed in preload register 125. This is accomplished by placing the new value on a data line into the register and asserting a load command on a load signal line into the register.

This circuit has several deficiencies. Although the circuit is programmable, it can only generate a single rate at any given time. A new rate requires a new preload value which must be loaded into the preload register. If several timing signals are needed, an extra counter and preload register are needed for each separate rate. If many rates are needed, this solution becomes very expensive.

Small changes in the preload value can result in a large change in the underflow rate. In the last example, changing the value from 19 to 18 results in an timing signal of 5.263 MHz. Unless the counter frequency is changed, no frequency between 5 MHz and 5.263 MHz can be generated. As the underflow frequency goes up, this "resolution" worsens. Acceptable resolution using this circuit requires a very high frequency counter, much higher than the fastest rate that the user may want to generate. In turn, the preload register must be large to accommodate large preload values to generate lower frequency timing signals.

A rate generator that can be programmed to generate many different timing signals from a single clock signal with high resolution and low cost would be an improvement on known timing signal generators.

SUMMARY OF THE INVENTION

A first embodiment of the present invention is a rate generator comprised of a memory, a first and second arithmetic unit, a multiplexer/demultiplexer, and a register. The memory stores a plurality of count, subtrahend, and preload values. Each operation is clocked by a fixed frequency clock signal coupled to the register. Initially, a count value and a subtrahend value are moved into the first arithmetic unit where the subtrahend value is subtracted from the count value. If an underflow condition results, a underflow signal is asserted. This underflow signal comprises the variable timing signal that the present invention generates. If the underflow signal is asserted, a preload value is moved from the memory through the multiplexer to the second arithmetic unit, where the preload value is added to the underflow. If no underflow occurs, a zero value is moved through the multiplexer into the second arithmetic unit, where the zero is added to the result from the first subtraction. The result of the addition in the second arithmetic unit is then moved into the register, from where it is returned to the memory as the revised count value.

Each different timing signal is determined by the ratio of the subtrahend value to the preload value(subtrahend/preload), which allows for very high resolution.

This high resolution does not require a high frequency counter, which permits the use of slower Random Access Memory ("RAM") to store the preload, subtrahend, and count values. A single memory holds the count, subtrahend and preload values, and the same arithmetic units, register, and multiplexer/demultiplexer are used to generate all the different timing signals, which makes generating many different timing signals relatively inexpensive.

The present invention will now be described in detail, with reference to the figures listed and described below.

BRIEF DESCRIPTION OF THE ILLUSTRATIONS

DETAILED DESCRIPTION OF THE PREFERRED EMBODIMENT

A preferred operating environment of the present invention is in a data source for a video server. The video server and the data source that comprise the preferred operating environment of the present invention are described in a patent application filed herewith and jointly owned, entitled "Video Server System". That disclosure is incorporated herein for all purposes.

Figure 1:
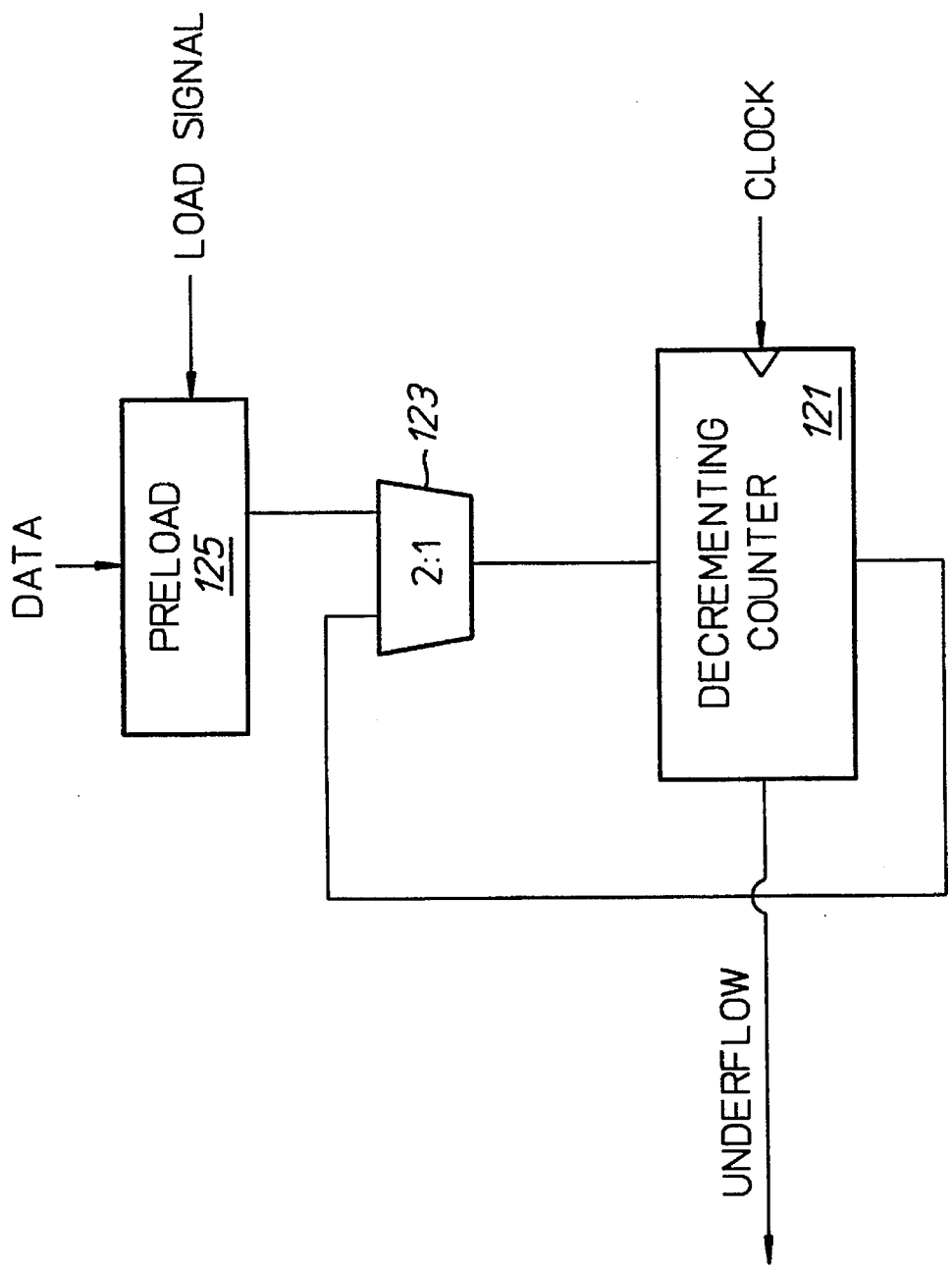
FIG. 1 is a block diagram of a known programmable rate generator (Prior Art)
Figure 2:
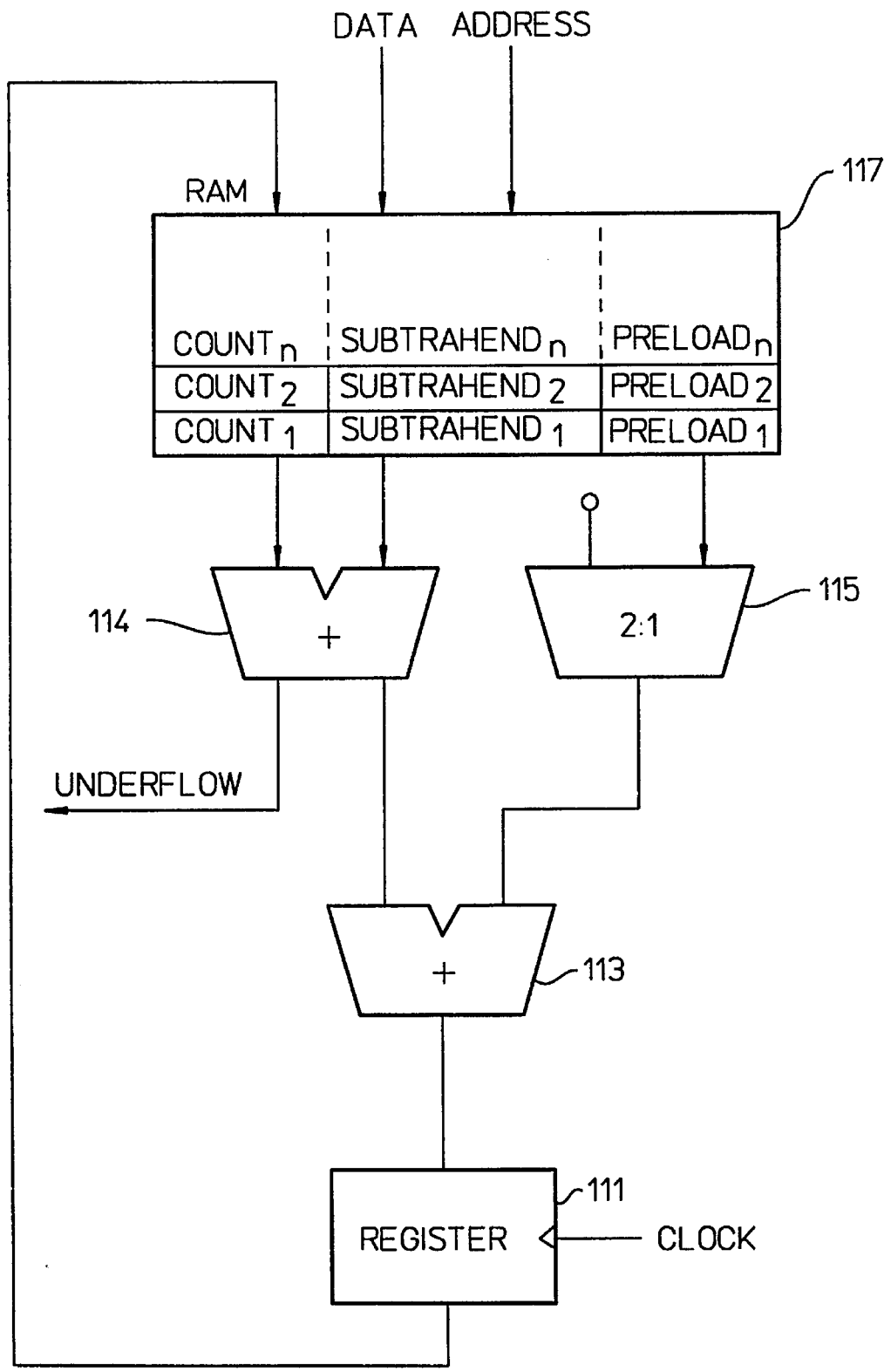
FIG. 2 is a block diagram of a first embodiment of the present invention.

The variable timing signal generator which comprises the first embodiment of the present invention is shown in FIG. 2. RAM 117 stores a count value, a subtrahend value and a preload value for each user. At the beginning of operations, the count value and the subtrahend value for a particular user are moved into adder/subtracter 114 and a subtraction occurs. If an underflow condition does not occur, a zero is moved through MUX 115 and added in adder/subtracter 113 to the value taken from adder/subtracter 114, the resultant sum being stored in register 111 momentarily before being returned to RAM 117 as the new count value.

If an underflow condition does result from the subtraction in adder/subtracter 114, an underflow signal is asserted, generating a rate that can be used to gate events. The preload value for that user is then moved from RAM 117 through MUX 115 to adder 113, where it is added to the value in adder/subtracter 114. The resultant sum moves through register 111 to RAM 117, where it is stored as the new count for that user.

In alternative embodiments, RAM 117 stores only the count and subtrahend value for each user. A separate register stores a preload value for all users.

In this first embodiment, 96 different subtrahend/count/preload values are stored in RAM 117. Each clock pulse moves another set of these values into the adder/subtracter units and the MUX. Thus, this first embodiment generates 96 different rates, each rate being generated successively. If a different rate must be generated, new values can be added to RAM 117 through data and addresses lines.

As the generated rate is determined by the ratio of two numbers, the subtrahend and the preload value, the resolution of the programmable rates is greater than that provided by known rate generators and remains relatively constant over a wide range of generated rates. The resolution of the generated rates is in fact determined by the width of the preload value. For fast rates, a large subtrahend value can be used, which permits the use of a large preload value, increasing resolution. At worst, resolution is determined by the width of the preload storage space. The Theory of Continued Fractions used in a known manner provides the best fit subtrahend and preload value for a given rate.

The rates generated by the circuit shown in FIG. 2 have some "jitter", as the same number of subtractions will not always occur between each assertion of the underflow signal. This jitter can be adjusted by varying the frequency with which the counter values are updated.

In this first embodiment of the present invention, jitter is intentionally allowed for the tradeoff of using a random access memory ("RAM") based pipeline which permits the use of the same arithmetic units and registers to generate many different timing signals. Permitting jitter also decreases the frequency with which each counter is clocked, and in turn results in the generation of a large number of independent timing signals, with high resolution, at a lower cost than known programmable rate generators.

Figure 3:
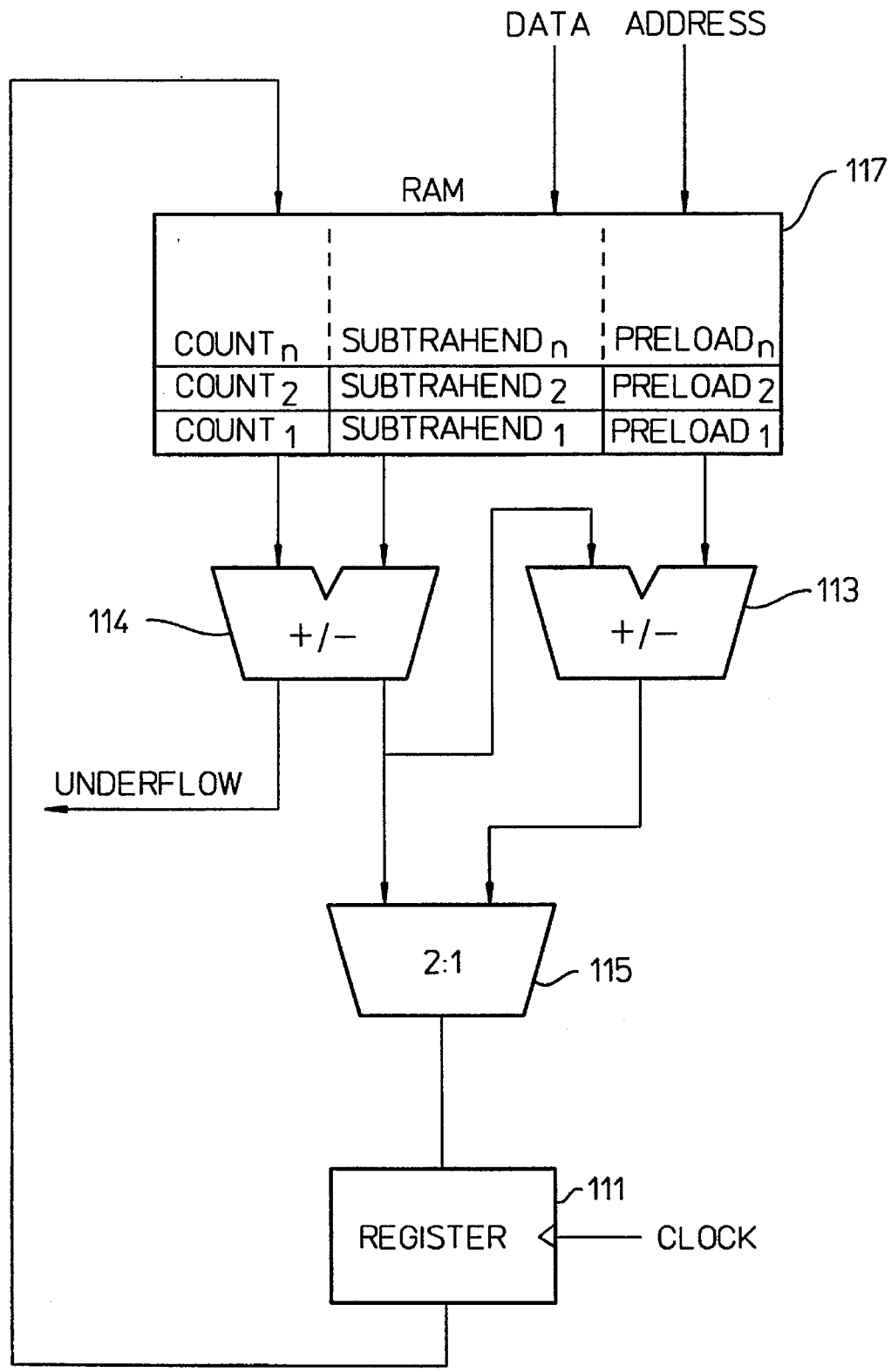
FIG. 3 is a block diagram of a second embodiment of the present invention.

A second embodiment of the present invention is shown in FIG. 3. RAM 117 is coupled directly to both inputs of adder/subtracter 114 and to one of adder/subtracter 113's inputs. The output of adder/subtracter 114 is coupled to both the first input of MUX 115 and the second input of adder/subtracter 113. The output of adder/subtracter 113 is coupled to the second of MUX 115's inputs. The output of MUX 115 is coupled to register 111, the output of which is coupled to RAM 117. Register 111 is also coupled to the clock signal.

In this second embodiment, the count and subtrahend values are moved into adder/subtracter 114 and subtracted. The result of the subtraction is added to the preload value which was moved from RAM 117 to adder/subtracter 113. If the subtraction caused an underflow, the underflow signal is asserted and the resultant value from adder/subtracter 113's addition is moved through MUX 115 into register 111. If no underflow resulted, then the result of the subtraction in adder/subtracter 114 is moved into register 111. The contents of register 111 are then returned to RAM 117 as the new count value.

What is claimed is:

1. A rate generator comprising:

a memory for storing a plurality of count, subtrahend, and preload values, each user having an associated preload, count and subtrahend value;

a first adder coupled to the memory for subtracting the subtrahend value from the count value and for generating an underflow signal if the result of the subtraction cause an underflow, the underflow signal providing the rate for the user;

a second adder coupled to the first adder for adding zero to the result of the subtraction if an underflow condition did not result and for adding the preload value to the result of the subtraction if an underflow did result;

a multiplexer coupled to the memory and second adder for switching a zero to the second adder if the result of the subtraction was not an underflow and for switching the preload value if the result of the subtraction was an underflow; and a register coupled to the second adder, the memory and a clock for storing the result of the addition operation in the second adder and for transmitting the result to the memory.

2. A rate generator comprising:

a storage unit for storing a plurality of count, subtrahend, and preload values, each user requiring a preload, count, and subtrahend value to generate a rate, first arithmetic unit coupled to the storage unit for subtracting a subtrahend value from a count value, the first arithmetic unit generating an underflow signal whenever the subtraction results in an underflow condition;

second arithmetic unit coupled to the first arithmetic unit for adding a zero to the result of the subtraction in the first arithmetic unit if the underflow condition did not occur and for adding the preload value to the result of the subtraction if an underflow condition did occur, switch unit coupled to the storage unit and the second arithmetic unit for supplying a zero to the second arithmetic unit if the subtraction did not result in an underflow condition and for supplying the preload value to the second arithmetic unit if the subtraction did result in an underflow condition; and result register coupled to the storage unit and the second arithmetic unit for storing the result of the addition operation in the second arithmetic unit and for transferring the stored result to the storage unit under the control timing of a system clock.

3. A variable rate generator comprising:

a memory for storing a plurality of count values, subtrahend values, and preload values, a count, subtrahend, and preload value being required for each rate generated;

a first adder for adding a selected count and subtrahend value, the first adder generating an underflow pulse if the addition of the count and subtrahend values causes an underflow, the underflow pulse forming the generated rate signal;

a second adder for adding the value from the first adder with zero if an underflow did not result from the first adder's addition and for adding the preload value to the value from the first adder if an underflow resulted from the first adder's addition;

a multiplexer coupled to the memory and the second adder, the multiplexer switching a zero to the second adder if an underflow did not result from the first adder's addition and the preload value to the second adder if an underflow resulted from the first adder's addition; and a register coupled to the second adder and the memory for storing the result of the second adder's addition and for transferring that result to the memory, the register also being coupled to a clock signal, the storing and transferring occurring in response to the clock signal.

4. A method for generating a timing signal, the method comprising the steps of:

subtracting a first subtrahend value from a first count value to generate a first result;

generating a timing pulse if the subtraction caused an underflow condition;

setting the count value equal to the addition of a preload value and the first result if the timing pulse was generated; and setting the count value equal to the first result if the timing pulse was not generated; and repeating the steps of subtracting, generating, setting and setting at a predetermined rate.

5. The method of claim 4 wherein a plurality of subtrahend values, count values, and preload values are used to generate a plurality of timing signals, a set of a preload value, a subtrahend value, and a count value generating a timing signal.

6. The variable rate generator of claim 3 wherein a second register stores a preload value and the same preload value is used to generate each variable rate.

7. A rate generator comprising:

a memory for storing a plurality of count, subtrahend, and preload values;

a first adder coupled to the memory for subtracting a subtrahend value from a count value, for generating a first result from the subtraction, and for generating an underflow signal if the subtraction results in an underflow;

a second adder coupled to the memory and the first adder for adding the first result and a preload value to generate a second result;

a multiplexer coupled to the first and second adder, the multiplexer receiving the first result if no underflow results from the subtraction and the multiplexer receiving the second result if an underflow results from the subtraction; and a register coupled to the multiplexer, the memory and a clock, the register receiving the contents of the multiplexer and transmitting them to the memory.

* * * * *